(12) United States Patent
Sano

(10) Patent No.: US 11,697,311 B2
(45) Date of Patent: Jul. 11, 2023

(54) PNEUMATIC TIRE

(71) Applicant: Toyo Tire Corporation, Itami (JP)

(72) Inventor: Shingo Sano, Itami (JP)

(73) Assignee: Toyo Tire Corporation, Itami (JP)

( * ) Notice: Subject to any disclaimer, the term of this patent is extended or adjusted under 35 U.S.C. 154(b) by 0 days.

(21) Appl. No.: 17/708,058

(22) Filed: Mar. 30, 2022

(65) Prior Publication Data

US 2022/0339966 A1 Oct. 27, 2022

(30) Foreign Application Priority Data

Apr. 26, 2021 (JP) ................................ 2021-073855

(51) Int. Cl.
*B60C 11/01* (2006.01)
*B60C 11/03* (2006.01)
*B60C 11/12* (2006.01)

(52) U.S. Cl.
CPC .......... *B60C 11/0306* (2013.01); *B60C 11/01* (2013.01); *B60C 11/12* (2013.01); *B60C 2011/0346* (2013.01); *B60C 2011/0365* (2013.01)

(58) Field of Classification Search
CPC .................................................... B60C 11/01
See application file for complete search history.

(56) References Cited

U.S. PATENT DOCUMENTS

2018/0029424 A1* 2/2018 Satake ..................... B60C 11/01
2021/0197620 A1* 7/2021 Maeda ................ B60C 11/1236

FOREIGN PATENT DOCUMENTS

JP       2003-211915 A       7/2003
JP       2003211915 A    *   7/2003

OTHER PUBLICATIONS

Machine Translation: JP-2003211915-A, Ochi N, (Year: 2023).*

* cited by examiner

*Primary Examiner* — Kendra Ly
(74) *Attorney, Agent, or Firm* — WHDA, LLP

(57) ABSTRACT

A pneumatic tire of the present disclosure includes a tread, wherein the tread includes: a shoulder main groove; a plurality of shoulder slits; and a plurality of shoulder blocks defined by the shoulder main groove and the shoulder slits, the shoulder blocks include inclined portions inclined inward in the tire radial direction from the shoulder blocks toward an outside in the tire axial direction, the inclined portions include: first inclined portions; and second inclined portions having dents dented more inward in the tire axial direction than the first inclined portions, and the first inclined portions are adjacent to each other with one of the shoulder slits interposed between the first inclined portions and the second inclined portions are adjacent to each other with other shoulder slit interposed between the second inclined portions, the one shoulder slit and the other shoulder slit being paired and defining the shoulder blocks.

20 Claims, 5 Drawing Sheets

PNEUMATIC TIRE

BACKGROUND OF THE INVENTION

Field of the Invention

The present disclosure relates to a pneumatic tire.

Description of the Related Art

Patent Document 1 discloses a pneumatic tire including a plurality of shoulder blocks defined by shoulder slits which are shoulder main grooves and lateral grooves, the shoulder blocks including inclined portions inclined inward in a tire radial direction toward an outside in a tire axial direction. The pneumatic tire constitutes the inclined portions by square shoulder portions having corner portions and by round shoulder portions having a substantially circular-arc curved surface shape, thereby improving traction performance on snow.

However, in the inclined portions, the round shoulder portions are arranged unevenly on one shoulder slit side, and are arrayed uniformly in a tire circumferential direction. Herein, such shoulder slits defined the shoulder blocks. Thus, the round shoulder portions and the square shoulder portions come close to each other with the shoulder slits interposed therebetween. As a result, in a pair of the shoulder blocks adjacent to each other with the shoulder slit interposed therebetween, there is a large difference in block rigidity between shoulder slit-side, whereby heel and toe wear in the shoulder blocks is prone to occur.

Prior Art Document

Patent Document

Patent Document 1: JP-A-2003-211915

SUMMARY OF THE INVENTION

It is an object of the present disclosure to provide a pneumatic tire having high heel and toe wear resistant performance while ensuring traction performance on a snowy road and a muddy road.

A pneumatic tire of the present disclosure includes: a pair of bead portions; a pair of sidewalls extending outward in a tire radial direction from the pair of bead portions; and a tread continuous with respective outer ends of the pair of sidewalls in the tire radial direction, wherein the tread includes: a shoulder main groove located on an outermost side in a tire axial direction among a plurality of main grooves extending in a tire circumferential direction; a plurality of shoulder slits extending more outward in the tire axial direction than the shoulder main groove; and a plurality of shoulder blocks defined by the shoulder main groove and the shoulder slits, the shoulder blocks include inclined portions inclined inward in the tire radial direction from the shoulder blocks toward an outside in the tire axial direction, the inclined portions include: first inclined portions; and second inclined portions having dents dented more inward in the tire axial direction than the first inclined portions, and the first inclined portions are adjacent to each other with one of the shoulder slits interposed between the first inclined portions and the second inclined portions are adjacent to each other with other shoulder slit interposed between the second inclined portions, the one shoulder slit and the other shoulder slit being paired and defining the shoulder blocks.

DETAILED DESCRIPTION OF THE PREFERRED EMBODIMENTS

Figure 1:
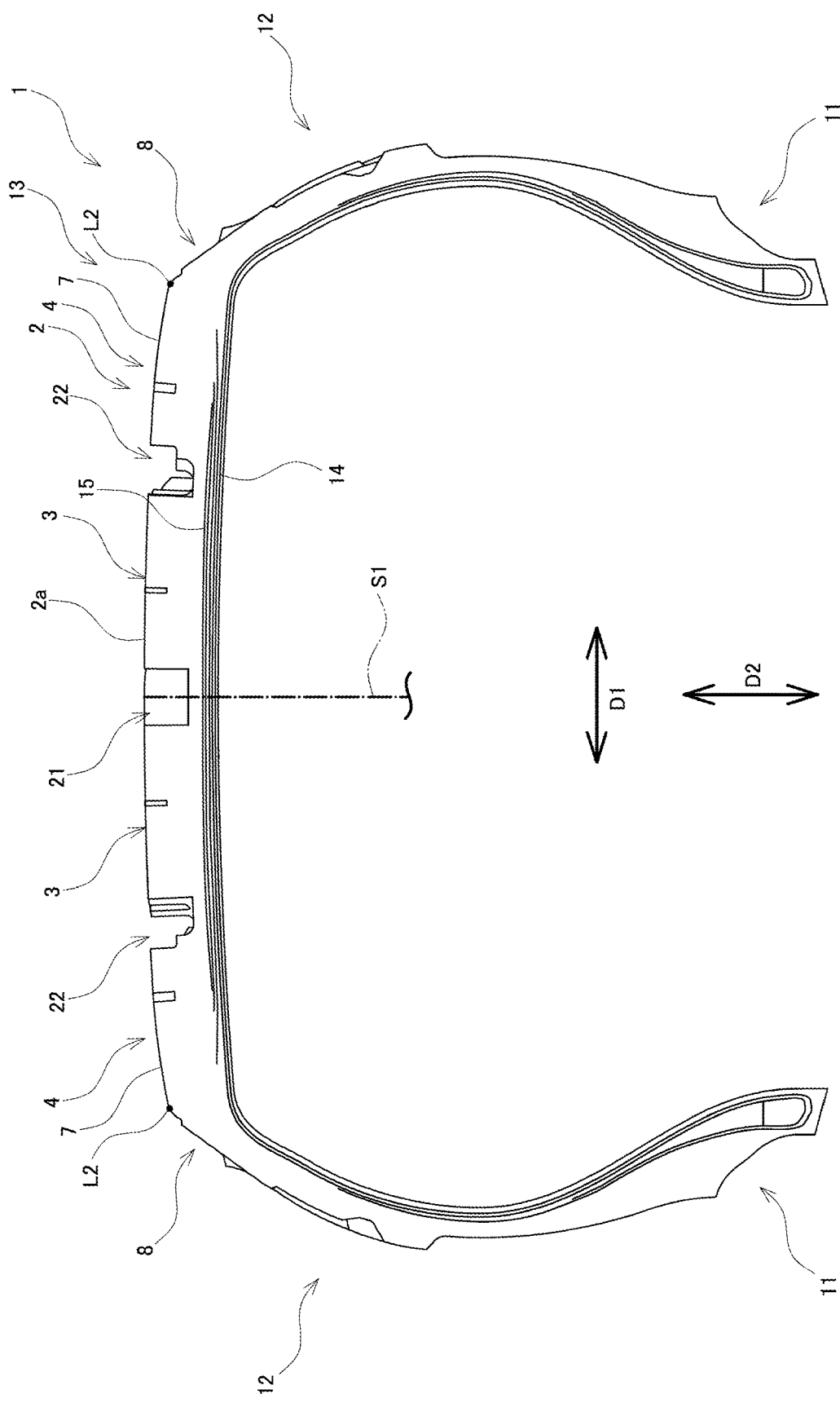
FIG. 1 is a cross-sectional view of a pneumatic tire according to an embodiment on a tire meridian plane.

Hereinafter, an embodiment of a pneumatic tire will be described with reference to FIGS. 1 to 6. Note that a dimensional ratio of the drawing does not necessarily coincide with an actual dimensional ratio in each of the drawings, and dimensional ratios in the respective drawings do not necessarily coincide with each other.

In each of the drawings, a first direction D1 is a tire axial direction D1 parallel to a tire rotation axis of a pneumatic tire (hereinafter, also simply referred to as a "tire") 1, a second direction D2 is a tire radial direction D2 that is a diameter direction of the tire 1, and a third direction D3 is a tire circumferential direction D3 around the tire rotation axis.

Note that, in the tire axial direction D1, the inner side is a side close to a tire equatorial plane S1, and the outer side is a side far from the tire equatorial plane S1. In the tire radial direction D2, the inner side is a side close to the tire rotation axis, and the outer side is a side far from the tire rotation axis.

The tire equatorial plane S1 is a plane orthogonal to the tire rotation axis and located at the center of the tire 1 in the tire axial direction D1, and the tire meridian plane is a plane including the tire rotation axis and orthogonal to the tire equatorial plane S1. A tire equator line L1 is a line along which an outer surface (a tread surface 2a to be described later) of the tire 1 in the tire radial direction D2 intersects with the tire equatorial plane S1.

As illustrated in FIG. 1, the tire 1 according to the present embodiment includes: a pair of bead portions 11 and 11; a pair of sidewalls 12 and 12 extending outward in a tire radial direction D2 from the respective bead portions 11 and 11; a tread 13 continuous with outer ends of the pair of sidewalls 12 and 12 in the tire radial direction D2; and a carcass ply 14 extending to be stretched between the pair of bead portions 11 and 11.

The tread 13 includes: a tread rubber 2 having the tread surface 2a that constitutes an outer surface of the tread 13; and a belt 15 disposed between the tread rubber 2 and the carcass ply 14. The tread surface 2a has a tire ground contact surface that is actually in contact with a road surface. Outer ends of the tire ground contact surface in the tire axial direction D1 are referred to as tread ground contact ends L2 and L2.

The tire ground contact surface is a portion in contact with a road surface when the tire 1 is mounted on a normal rim (not shown), is placed perpendicularly to such a flat road surface in a state of being filled with a normal internal pressure, and is then applied with a normal load.

In a standard system including a standard on which the tire 1 is based, the normal rim is a rim defined for each tire by the standard and is, for example, a standard rim in the case of the Japan Automobile Tyre Manufacturers Association (JATMA), "Design Rim" in the case of the Tire and Rim Association, Inc. (TRA), or "Measuring Rim" in the case of the European Tyre and Rim Technical Organization (ETRTO).

In the standard system including the standard on which the tire 1 is based, the normal internal pressure is an air pressure defined for each tire by the standard and is, for example, a maximum air pressure in the case of JATMA, a maximum value described in Table "TIRE LOAD LIMITS AT VARIOUS COLD INFLATION PRESSURES" in the case of TRA, and "INFLATION PRESSURE" in the case of ETRTO.

The normal load is a load defined for each tire by each standard in the standard system including the standard on which the tire 1 is based. The normal load is the maximum load capacity in the case of JATMA, the maximum value described in the above table in the case of TRA, and "LOAD CAPACITY" in the case of ETRTO.

Figure 2:
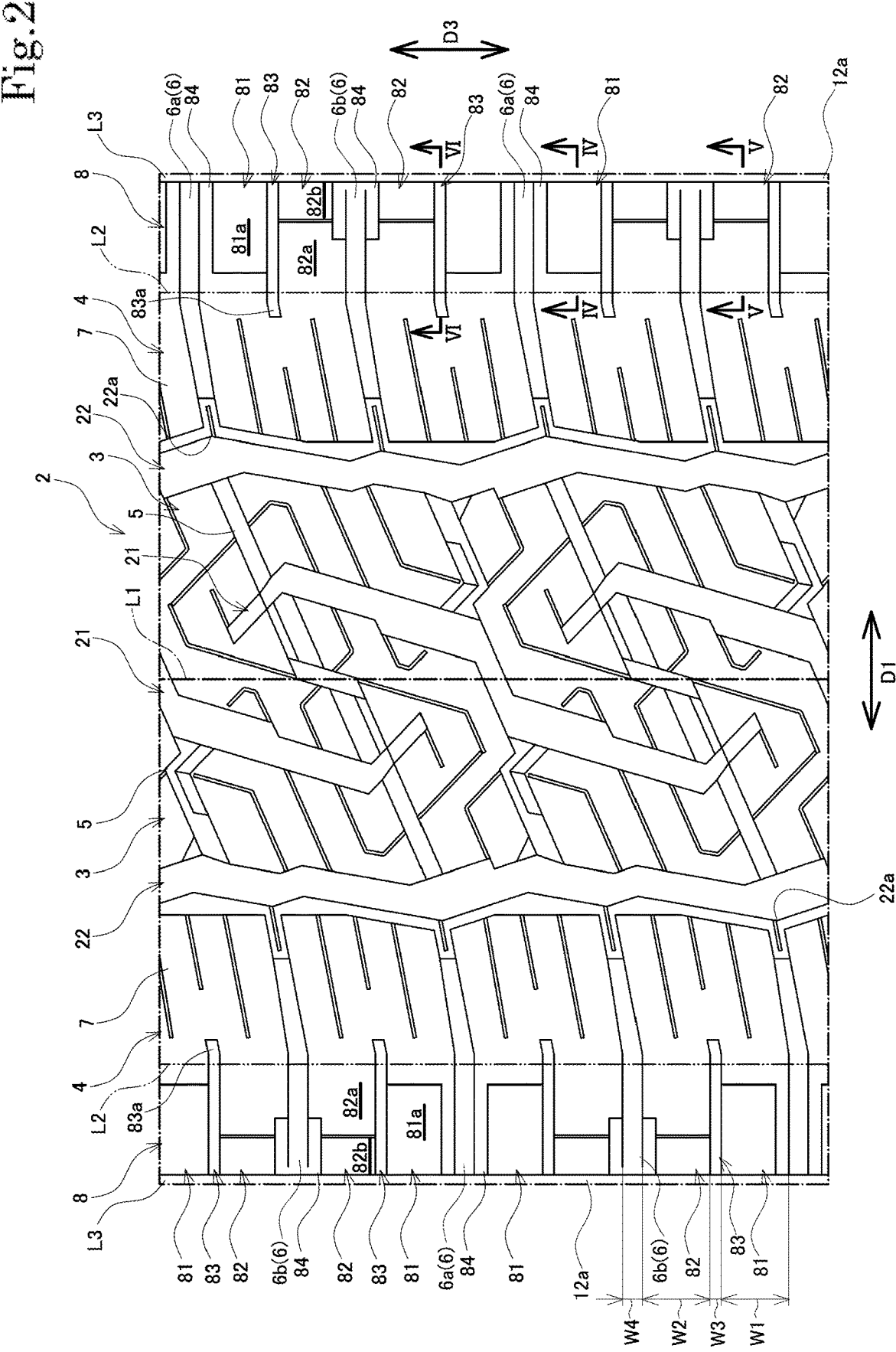
FIG. 2 is a view of illustrating a tread pattern of the pneumatic tire according to the embodiment.

As illustrated in FIGS. 1 and 2, the tread rubber 2 includes: a center main groove 21 located inside in the tire axial direction D1 between a plurality of main grooves 21 and 22 extending in the tire circumferential direction D3; and a pair of shoulder main grooves 22 and 22 located on an outermost side in the tire axial direction D1 (that is, outside of the center main groove 21 in the tire axial direction D1) between the plurality of main grooves 21 and 22. On the tread rubber 2, the main grooves 21 and 22 are individually arranged at an interval in the tire axial direction D1. In the present embodiment, the center main groove 21 extends discontinuously in the tire circumferential direction D3, and the shoulder main grooves 22 extend continuously in a zigzag pattern in the tire circumferential direction D3; however, the main grooves 21 and 22 are not limited to such a configuration.

The tire 1 includes: a center land 3 formed between the pair of shoulder main grooves 22 and 22; and a pair of shoulder lands 4 and 4 formed outside the shoulder main grooves 22 and 22 in the tire axial direction D1. The center land 3 is disposed between the pair of shoulder lands 4 and 4, and the pair of shoulder lands 4 and 4 are disposed on the outer ends of the tread surface 2a in the tire axial direction D1.

The tire 1 includes: a plurality of center slits 5 arranged on the center land 3; and a plurality of shoulder slits 6 arranged on the shoulder lands 4. The center slits 5 extend from one of the shoulder main grooves 22 toward the other shoulder main groove 22 to be inclined with respect to the tire axial direction D1.

The shoulder slits 6 extend more outward than the shoulder main grooves 22 in the tire axial direction D1 across the tread ground contact ends L2. In the present embodiment, the shoulder slits 6 extend from groove dents 22a of the shoulder main grooves 22 having a zigzag pattern to splitting positions L3 for a sector for forming the tread 13 and side plates for forming the sidewalls 12 in a tire vulcanizing mold (not shown). However, the shoulder slits 6 are not limited to this. Note that, since line marks occur on the splitting positions L3 during vulcanization of the tire 1, the splitting positions L3 can be identified according to whether or not there are line marks on outer surfaces of the sidewalls 12.

In the present embodiments, the shoulder slits 6 communicate with the shoulder main grooves 22. Note that the shoulder slits 6 may be configured, for example, not to communicate with the shoulder main grooves 22, that is, the shoulder slits 6 may be configured to terminate in the shoulder lands 4.

In the present embodiment, the sidewalls 12 include annular ribs 12a extending along the tire circumferential direction D3, and the annular ribs 12a are arranged on the splitting positions L3. The annular ribs 12a protrude more outward in the tire axial direction D1 than a surface profile 12p, and are formed into a trapezoidal shape in cross section.

In the present embodiment, the shoulder slits 6 extend from the shoulder main grooves 22 to the vicinities of the tread ground contact ends L2 to be inclined with respect to the tire axial direction D1, and extend outward in the tire axial direction D1 from the vicinities of the tread ground contact ends L2 along the tire axial direction D1. However, the shoulder slits 6 are not limited to this. An inclination angle of the shoulder slits 6 with respect to the tire axial direction D1 is smaller than an inclination angle of the center slits 5 with respect to the tire axial direction D1, but is not limited to this.

Figure 3:
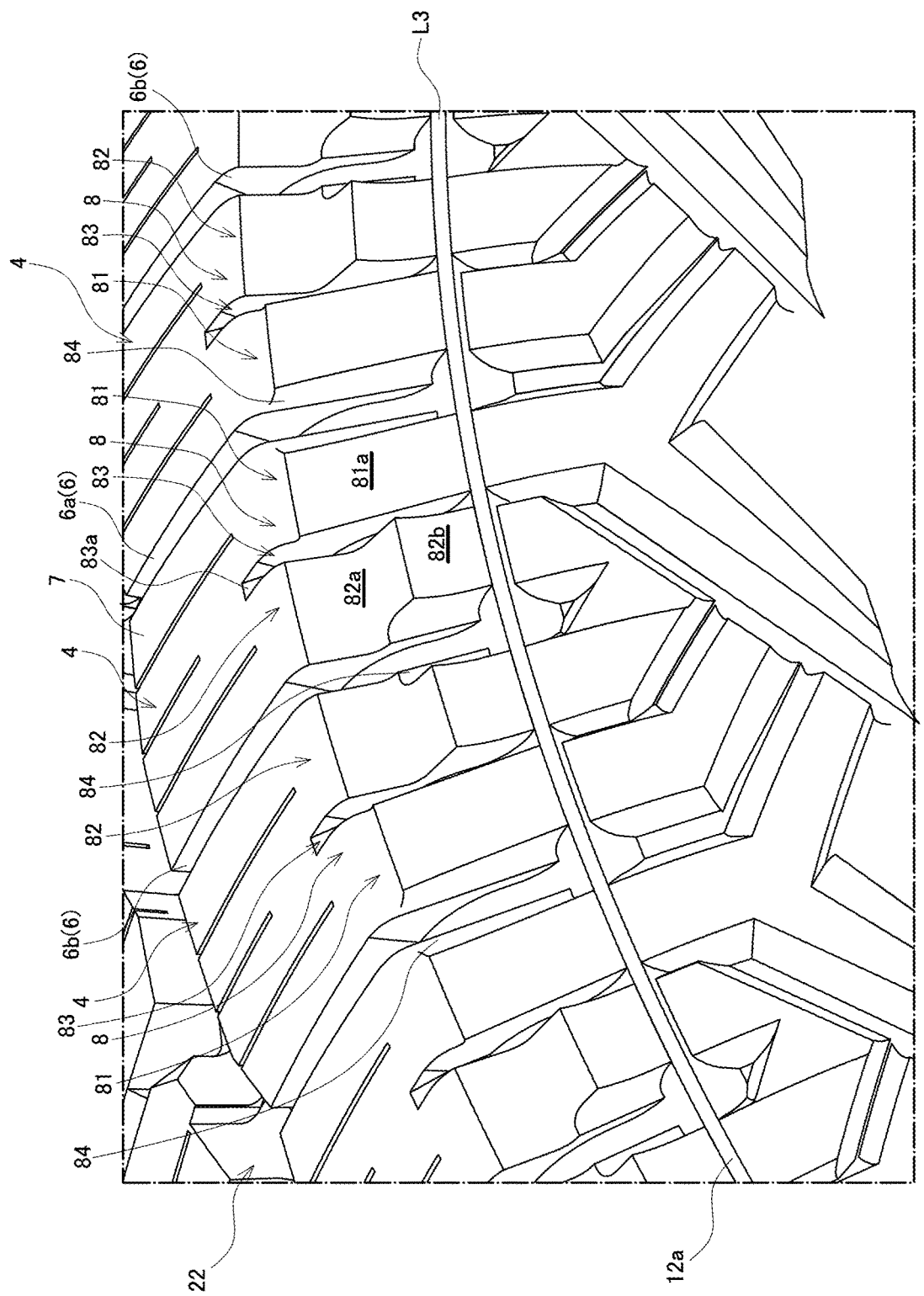
FIG. 3 is a perspective view illustrating a main part of the pneumatic tire according to the embodiment.

As illustrated in FIGS. 1 to 3, the tread 13 includes: a plurality of shoulder blocks 7 defined by the shoulder main grooves 22 and the shoulder slits 6. Each of the shoulder lands 4 is composed of a plurality of shoulder blocks 7. The shoulder blocks 7 include inclined portions 8 inclined inward in the tire radial direction D2 toward the outside in the tire axial direction D1. The inclined portions 8 constitute outer surfaces of the shoulder blocks 7 in the tire axial direction D1. In the present embodiment, the inclined portions 8 are defined by the shoulder slits 6, and extend to the splitting positions L3.

In the present embodiment, the inclined portions 8 having a feature to be described below are arranged on both sides in the tire axial direction D1, but without being limited to this, just need to be arranged on at least one side in the tire axial direction D1. From a viewpoint of ensuring traction performance and heel and toe wear resistant performance on a snowy road and a muddy road, preferably, such inclined portions 8 are arranged on both sides in the tire axial direction D1.

Each of the inclined portions 8 includes: a first inclined portion 81; and a second inclined portion 82 having a dent 82a dented more inward in the tire axial direction D1 than the first inclined portion 81. The first inclined portion 81 is arranged adjacent to one shoulder slit 6a between a pair of the shoulder slits 6 which define the shoulder block 7, and the second inclined portion 82 is arranged adjacent to the other shoulder slit 6b between the pair of shoulder slits 6 which define the shoulder block 7. In the present embodiment, a width W1 of the first inclined portion 81 in the tire circumferential direction D3 is substantially the same as a width W2 of the second inclined portion 82 in the tire circumferential direction D3.

In the other shoulder block 7 adjacent to the shoulder block 7 with one shoulder slit 6a interposed therebetween, the first inclined portion 81 thereof is adjacent to the other first inclined portion 81. Then, in the other shoulder block 7 adjacent to the shoulder block 7 with the other shoulder slit 6b interposed therebetween, the second inclined portion 82 thereof is adjacent to the other second inclined portion 82. That is, between the pair of shoulder slits 6a and 6b which define the inclined portions 8, the first inclined portions 81 and 81 are adjacent to each other with one shoulder slit 6a interposed therebetween, and the second inclined portions 82 and 82 are adjacent to each other with the other shoulder slit 6b interposed therebetween.

In the present embodiment, the shoulder blocks 7 in each of which the first inclined portion 81 is formed on one side in the tire circumferential direction D3 and the second inclined portion 82 is formed on the other side in the tire circumferential direction D3 and the shoulder blocks 7 in each of which the second inclined portion 82 is formed on one side in the tire circumferential direction D3 and the first inclined portion 81 is formed on the other side in the tire circumferential direction D3 are arranged alternately with each other in the tire circumferential direction D3.

Figure 4:
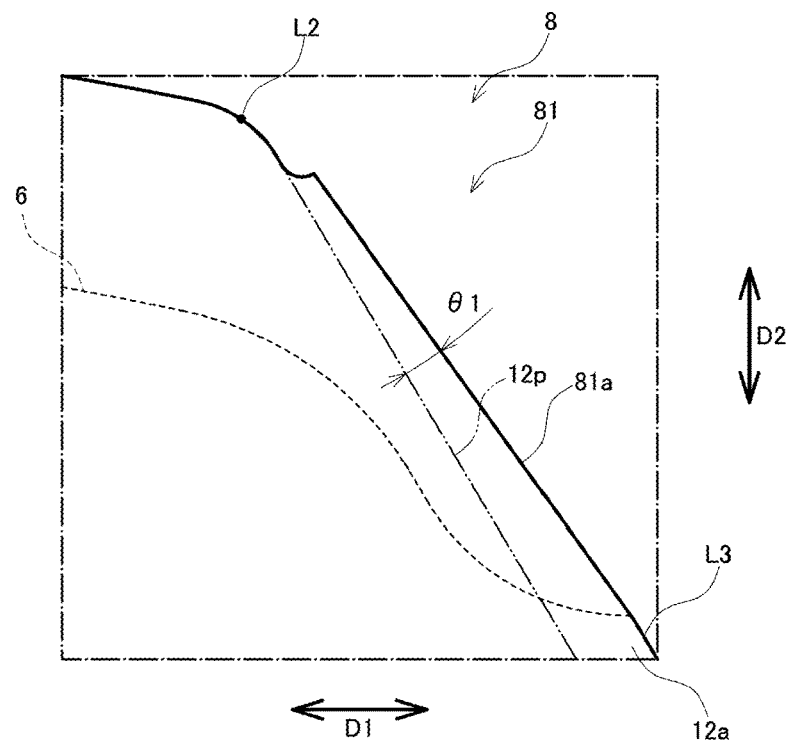
FIG. 4 is an enlarged cross-sectional view taken along a line IV-IV of FIG. 2.
Figure 5:
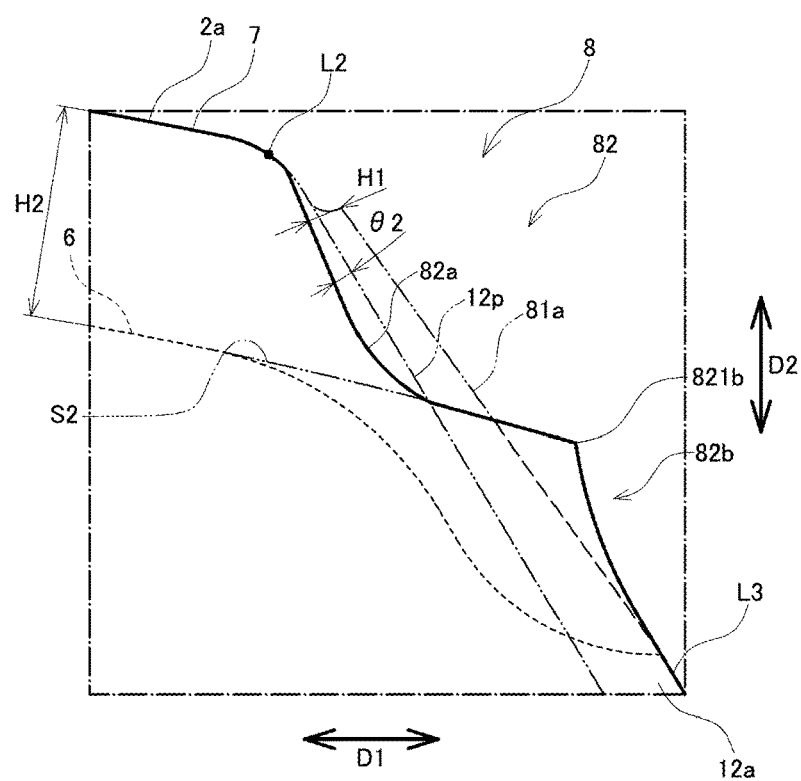
FIG. 5 is an enlarged cross-sectional view taken along a line V-V of FIG. 2.

As illustrated in FIGS. 4 and 5, the first inclined portion 81 is inclined along each of the surface profiles 12p, and the second inclined portion 82 is inclined more inward in the tire axial direction D1 than the surface profile 12p. Therefore, on the shoulder block 7, a step difference is formed in the tire circumferential direction D3 by the first inclined portion 81 and the second inclined portion 82. The surface profile 12p is an outline of an outer surface of the tire 1, the outer surface smoothly connecting the tread 13 and the sidewall 12 to each other.

As illustrated in FIG. 4, the first inclined portion 81 includes, at least in the inside in the tire radial direction D2, a first protrusion 81a that protrudes more outward in the tire axial direction D1 than the surface profile 12p. The first protrusion 81a is provided, whereby the first protrusion 81a catches on snow and mud on the snowy road and the muddy road, and accordingly, the traction performance of the tire 1 on the snowy road and the muddy road can be improved. The first protrusion 81a is inclined with respect to the surface profile 12p. Preferably, an inclination angle θ1 between the first protrusion 81a and the surface profile 12p is 5 degrees or more. In the present embodiment, the inclination angle θ1 is 5.1 degrees to the outside in the tire axial direction D1, but is not limited to this. In the present embodiment, the first protrusion 81a extends to the splitting position L3 from the outside of the tread ground contact end L2 in the tire radial direction D2, but is not limited to this. For example, the first protrusion 81a may be arranged only in the vicinity of the splitting position L3, or may extend from the tread ground contact end L2 to the splitting position L3.

As illustrated in FIG. 5, the second inclined portion 82 includes, on the outside in the tire radial direction D2, a dent 82a dent more inward in the tire axial direction D1 than the surface profile 12p. The dent 82a is inclined with respect to the surface profile 12p, and preferably, an inclination angle θ2 between the dent 82a and the surface profile 12p is 5 degrees or more to the inside in the tire axial direction D1. In the present embodiment, the inclination angle θ2 is 8 degrees to the inside in the tire axial direction D1, but is not limited to this.

At least partially, the first protrusion 81a and the dent 82a are located at substantially the same position in the tire radial direction D2. From a viewpoint of ensuring the traction performance of the tire 1 on the snowy road and the muddy road, a minimum step difference height H1 between the first protrusion 81a and the dent 82a is preferably 1 mm or more, more preferably 1.5 mm or more. In the present embodiment, the dent 82a extends from the outer end in the tire radial direction D2 to a groove bottom depth H2 of the shoulder slit 6, but is not limited to this.

The second inclined portion 82 includes a second protrusion 82b that is arranged more inward in the tire radial direction D2 than the dent 82a and protrudes more outward in the tire axial direction D1 than the surface profile 12p. At least partially, the first protrusion 81a and the second protrusion 82b are located at substantially the same position in the tire radial direction D2. The second protrusion 82b includes a protruding portion 821b that protrudes more outward in the tire axial direction D1 than the first protrusion 81a. The protruding portion 821b is provided on the second protrusion 82b, whereby the protruding portion 821b catches on snow and mud on the snowy road and the muddy road, and accordingly, the traction performance of the tire 1 on the snowy road and the muddy road can be improved. Note that the second protrusion 82b may be configured, for example, not to include the protruding portion 821b. In the present embodiment, the protruding portion 821b has a substantially triangular cross-sectional shape, but is not limited to such a shape.

In the present embodiment, the second protrusion 82b extends to the splitting position L3 from an inner end of the dent 82a in the tire radial direction D2, but is not limited to this. An outer end of the second protrusion 82b in the tire radial direction D2 coincides with an extended surface S2 obtained by extending a groove bottom surface of the shoulder slit 6 outward in the tire axial direction D1, but is not limited to this.

Figure 6:
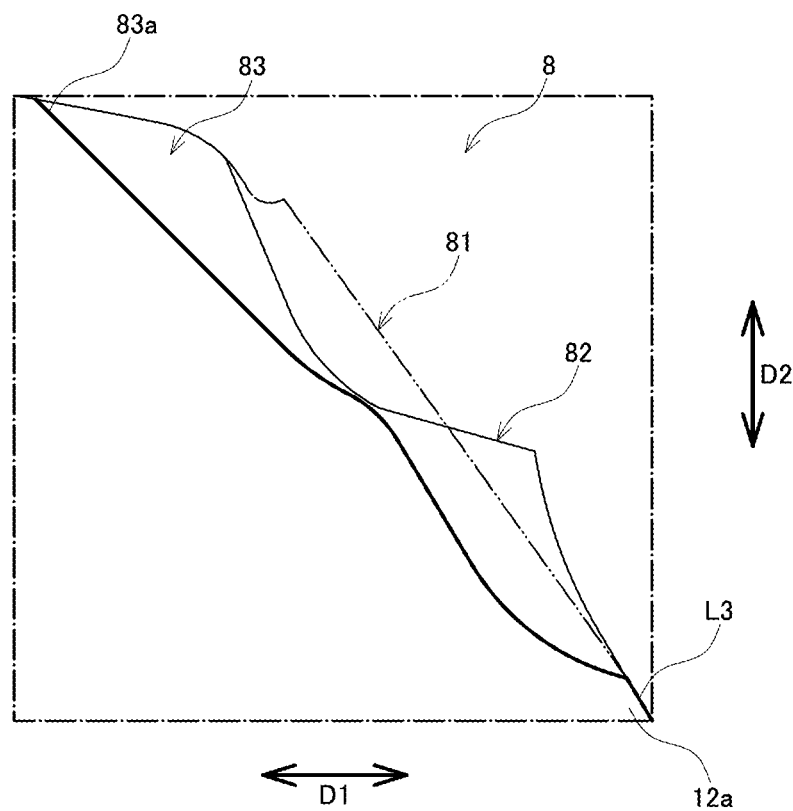
FIG. 6 is an enlarged cross-sectional view taken along a line VI-VI of FIG. 2.

As illustrated in FIGS. 2, 3 and 6, each of the inclined portions 8 includes an auxiliary slit 83 extending along the tire axial direction D1. In the present embodiment, the auxiliary slit 83 is arranged between the first inclined portion 81 and the second inclined portion 82. The auxiliary slit 83 is arranged so as to pass through the center of the shoulder block 7 or the inclined portion 8 in the tire circumferential direction D3. Thus, an uneven distribution of the block rigidity of the shoulder block 7 in the tire circumferential direction D3, the uneven distribution being caused by providing the auxiliary slit 83, can be reduced, and when the tire 1 contacts the ground, uneven wear can be suppressed from occurring in the shoulder block 7.

A slit end portion 83a that is an inner end of the auxiliary slit 83 in the tire axial direction D1 is arranged on the shoulder block 7 located more inside in the tire axial direction D1 than the tread ground contact end L2. Then, the slit end portion 83a is inclined with respect to the tire axial direction D1 so as to be parallel to the shoulder slit 6. The slit end portion 83a is inclined in parallel to the shoulder slit 6, whereby, when the tire 1 contacts the ground, an uneven distribution of a ground contact pressure applied to the shoulder block 7 can be suppressed, and the uneven wear can be suppressed from occurring in the shoulder block 7. In the present embodiment, the slit end portion 83a terminates in the shoulder block 7 located more inside in the tire axial direction D1 than the tread ground contact end L2, but is not limited to this. A groove width W3 of the auxiliary slit 83 is smaller than a groove width W4 of the shoulder slit 6.

As illustrated in FIGS. 2 and 3, in the present embodiment, the inclined portion 8 includes a slit end groove 84 that is arranged on an outer end of the shoulder slit 6 in the tire axial direction D1 and extends along the surface profile 12p (see FIGS. 4 and 5). Note that the inclined portion 8 may be configured, for example, not to include the slit end groove 84.

Such slit end grooves 84 are arranged so as to scoop out end portions of the first inclined portions 81 and 81 adjacent to each other with the shoulder slit 6 interposed therebetween and the second inclined portions 82 and 82 adjacent to each other with the shoulder slit 6 interposed therebetween, the end portions being located closer to the shoulder slits 6. The slit end grooves 84 is provided, whereby the slit end grooves 84 catch on snow and mud on the snowy road and the muddy road, and accordingly, the traction performance of the tire 1 on the snowy road and the muddy road can be improved.

As described above in the present embodiment, preferably, the tire 1 is configured to include: the pair of bead portions 11; the pair of sidewalls 12 extending outward in the tire radial direction D2 from the pair of bead portions 11; and the tread 13 continuous with the respective outer ends of the pair of sidewalls 12 in the tire radial direction D2, wherein the tread 13 includes: the shoulder main groove 22 located on the outermost side in the tire axial direction D1 among the plurality of main grooves 21 and 22 extending in the tire circumferential direction D3; the plurality of shoulder slits 6 extending more outward in the tire axial direction D1 than the shoulder main groove 22; and the plurality of shoulder blocks 7 defined by the shoulder main groove 22 and the shoulder slits 6, the shoulder blocks 7 include the inclined portions 8 inclined inward in the tire radial direction D2 from the shoulder blocks 7 toward the outside in the tire axial direction D1, the inclined portions 8 include: first inclined portions 81; and second inclined portions 82 having dents 82a dented more inward in the tire axial direction D1 than the first inclined portions 81, and the first inclined portions 81 and 81 are adjacent to each other with a shoulder slit 6a interposed therebetween and the second inclined portions 82 and 82 are adjacent to each other with a shoulder slit 6b interposed therebetween, the one of the shoulder slit 6a and the other shoulder slit 6b being paired and defining the shoulder blocks 7.

With such a configuration, the dents 82a dented more than the first inclined portions 81 are provided whereby the first inclined portions 81 can be caught on snow and mud on the snowy road and the muddy road, and accordingly, the traction performance of the tire 1 on the snowy road and the muddy road can be ensured. Moreover, the first inclined portions 81 and 81 are made adjacent to each other with the one shoulder slit 6a interposed therebetween, and the second inclined portions 82 and 82 are made adjacent to each other with the other shoulder slit 6b interposed therebetween, whereby, in two shoulder blocks 7 and 7 adjacent to each other with the shoulder slit 6 interposed therebetween, such block rigidities in regions thereof close to the shoulder slit 6 can be approximated to each other, and the heel and toe wear resistant performance of the tire 1 can be improved. Thus, the heel and toe wear resistant performance of the tire 1 can be improved while ensuring the traction performance of the tire 1 on the snowy road and the muddy road.

Further, as in the present embodiment, in the tire 1, such a configuration is preferable, in which each of the first inclined portions 81 includes the first protrusion 81a protruding more outward in the tire axial direction D1 than the surface profile 12p of at least one of the sidewalls 12, each of the dents 82a is dented more inward in the tire axial direction D1 than the surface profile 12p, and at least partially, the first protrusion 81a and the dent 82a are arranged at substantially the same position in the tire radial direction D2.

With such a configuration, the first protrusion 81a becomes easy to catch on snow and mud on the snowy road and the muddy road, and accordingly, the traction performance of the tire 1 on the snowy road and the muddy road can be improved.

Moreover, as in the present embodiment, in the tire 1, such a configuration is preferable, in which each of the second inclined portions 82 includes the protruding portion 821b that is arranged more inward in the tire radial direction D2 than the dent 82a and protrudes more outward in the tire axial direction D1 than the first protrusion 81a.

With such a configuration, the protruding portion 821b protruding more than the first protrusion 81a is provided, whereby the protruding portion 821b catches on snow and mud on the snowy road and the muddy road, and accordingly, the traction performance of the tire 1 on the snowy road and the muddy road can be improved.

Further, as in the present embodiment, in the tire 1, such a configuration is preferable, in which each of the inclined portions 8 includes the auxiliary slit 83 extending along the tire axial direction D1, and one end portion (the slit end portion 83a) of the auxiliary slit 83 terminates in the shoulder block 7 located more inside in the tire axial direction D1 than the tread ground contact end L2.

With such a configuration, the auxiliary slit 83 is provided, whereby the auxiliary slit 83 catches on snow and mud on the snowy road and the muddy road, and accordingly, the traction performance of the tire 1 on the snowy road and the muddy road can be improved.

Note that the tire 1 is not limited to the configuration of the embodiment described above and is not limited to the operation and effect described above. Moreover, as a matter of course, the tire 1 can be modified in various ways within the scope without departing from the spirit of the present invention. For example, it is a matter of course that one or more configurations, methods, and the like according to various modification examples described below may be arbitrarily selected and adopted in the configuration, method, and the like according to the embodiment described above.

(1) In the present embodiment, the first inclined portion 81 is configured to include the first protrusion 81a that protrudes more outward in the tire axial direction D1 than the surface profile 12p. However, the first inclined portion 81 is not limited to such a configuration. For example, the first inclined portion 81 may be configured not to include the first protrusion 81a and to be inclined along the surface profile 12p.

(2) In the present embodiment, the first protrusion 81a is configured to be inclined outward in the tire axial direction D1 with respect to the surface profile 12p, and the dent 82a is configured to be inclined inward in the tire axial direction D1 with respect to the surface profile 12p. However, the first protrusion 81a and the dent 82a are not limited to such configurations. For example, the first protrusion 81a may be configured to be arranged outside of the surface profile 12p in the tire axial direction D1 and to be inclined in parallel to the surface profile 12p, and the dent 82a may be configured to be arranged inside of the surface profile 12p in the tire axial direction D1 and to be inclined in parallel to the surface profile 12p.

(3) In the present embodiment, the first inclined portion 81 and the second inclined portion 82 are configured to have the same width in the tire circumferential direction D3. However, the first inclined portion 81 and the second inclined portion 82 are not limited to such a configuration. For example, the first inclined portion 81 and the second inclined portion 82 may be configured to have different widths in the tire circumferential direction D3.

(4) In the present embodiment, the inclined portion 8 is configured to include the first inclined portion 81 and the second inclined portion 82. However, the inclined portion 8 is not limited to such a configuration. For example, the inclined portion 8 may be configured to include the first inclined portion 81, the second inclined portion 82 and a third inclined portion, in which the third inclined portion is different in shape from the first inclined portion 81 and the second inclined portion 82, and is arranged between the first inclined portion 81 and the second inclined portion 82.

(5) In the present embodiment, the inclined portion 8 is configured to extend from the shoulder block 7 to the splitting position L3. However, the inclined portion 8 is not limited to such a configuration. For example, the inclined portion 8 may be configured to extend from the shoulder block 7 more inward in the tire radial direction D2 than the splitting position L3. Further, when a tire mold is a two-piece mold, the inclined portion 8 may be configured to extend to a position on the sidewall 12, which corresponds to the splitting position L3.

What is claimed is:

1. A pneumatic tire comprising:
a pair of bead portions; a pair of sidewalls extending outward in a tire radial direction from the pair of bead portions; and a tread continuous with respective outer ends of the pair of sidewalls in the tire radial direction, wherein
the tread includes a shoulder main groove located on an outermost side in a tire axial direction among a plurality of main grooves extending in a tire circumferential direction, a plurality of shoulder slits extending more outward in the tire axial direction than the shoulder main groove, and a plurality of shoulder blocks defined by the shoulder main groove and the shoulder slits,
the shoulder blocks include inclined portions inclined inward in the tire radial direction toward an outside in the tire axial direction,
the inclined portions include first inclined portions, and second inclined portions having dents dented more inward in the tire axial direction than the first inclined portions, and
the first inclined portions are adjacent to each other with one of the shoulder slits interposed between the first inclined portions, and the second inclined portions are adjacent to each other with other shoulder slit interposed between the second inclined portions, the one of the shoulder slit and the other shoulder slit being paired and defining the shoulder blocks.

2. The pneumatic tire according to claim 1, wherein the inclined portions are arranged on both sides in the tire axial direction.

3. The pneumatic tire according to claim 1, wherein a width of each of the first inclined portions in the tire circumferential direction is substantially same as a width of each of the second inclined portions in the tire circumferential direction.

4. The pneumatic tire according to claim 1, wherein shoulder blocks in each of which the first inclined portion is formed on one side in the tire circumferential direction and the second inclined portion is formed on other side in the tire circumferential direction and shoulder blocks in each of which the second inclined portion is formed on one side in the tire circumferential direction and the first inclined portion is formed on other side in the tire circumferential direction are arranged alternately with each other in the tire circumferential direction.

5. The pneumatic tire according to claim 1, wherein
each of the first inclined portions is inclined along a surface profile of at least one of the sidewalls, and
each of the second inclined portions is inclined more inward in the tire axial direction than the surface profile.

6. The pneumatic tire according to claim 1, wherein each of the dents is inclined with respect to a surface profile of at least one of the sidewalls.

7. The pneumatic tire according to claim 1, wherein
each of the first inclined portions includes a protrusion protruding more outward in the tire axial direction than a surface profile of at least one of the sidewalls,
each of the dents is dented more inward in the tire axial direction than the surface profile, and
at least partially, the protrusion and the dent are arranged at substantially a same position in the tire radial direction.

8. The pneumatic tire according to claim 7, wherein each of the second inclined portions includes a protruding portion that is arranged more inward in the tire radial direction than the dent and protrudes more outward in the tire axial direction than the protrusion.

9. The pneumatic tire according to claim 7, wherein the protrusion is inclined with respect to the surface profile.

10. The pneumatic tire according to claim 7, wherein a minimum step difference height between the protrusion and the dent is 1 mm or more.

11. The pneumatic tire according to claim 1, wherein
each of the inclined portion includes an auxiliary slit extending along the tire axial direction, and
one end portion of the auxiliary slit terminates in the shoulder block located more inside in the tire axial direction than a tread ground contact end.

12. The pneumatic tire according to claim 11, wherein the auxiliary slit is arranged to pass through a center of the shoulder block or the inclined portion in the tire circumferential direction.

13. The pneumatic tire according to claim 11, wherein one end portion of the auxiliary slit is inclined with respect to the tire axial direction to be parallel to the shoulder slit.

14. The pneumatic tire according to claim 11, wherein a groove width of the auxiliary slit is smaller than a groove width of the shoulder slit.

15. The pneumatic tire according to claim 1, wherein
the shoulder main groove extends continuously in a zigzag pattern, and
the shoulder slits extend from groove dents of the shoulder main groove across a tread ground contact end.

16. The pneumatic tire according to claim 15, wherein each of the shoulder slits extends from the shoulder main groove to a vicinity of the tread ground contact end to be inclined with respect to the tire axial direction, and extends along the tire axial direction outward in the tire axial direction from the vicinity of the tread ground contact end.

17. The pneumatic tire according to claim 15, wherein each of the shoulder slits extends to a splitting position for a sector for forming the tread and a side plate for forming the sidewall in a tire vulcanizing mold.

18. The pneumatic tire according to claim 1, wherein each of the second inclined portions includes a second protrusion that is arranged more inward in the tire radial direction than the dent and protrudes more outward in the tire axial direction than a surface profile of at least one of the sidewalls.

19. The pneumatic tire according to claim 18, wherein
each of the first inclined portions includes a first protrusion protruding more outward in the tire axial direction than the surface profile, and
at least partially, the first protrusion and the second protrusion are arranged at substantially a same position in the tire radial direction.

20. The pneumatic tire according to claim 18, wherein an outer end of the second protrusion in the tire radial direction coincides with an extended surface obtained by extending a groove bottom surface of each of the shoulder slits outward in the tire axial direction.

\* \* \* \* \*